July 23, 1940.      A. C. LUSHER      2,209,062
NOZZLE CLOSURE MEANS FOR CONTAINERS
Filed Oct. 28, 1938      5 Sheets-Sheet 2
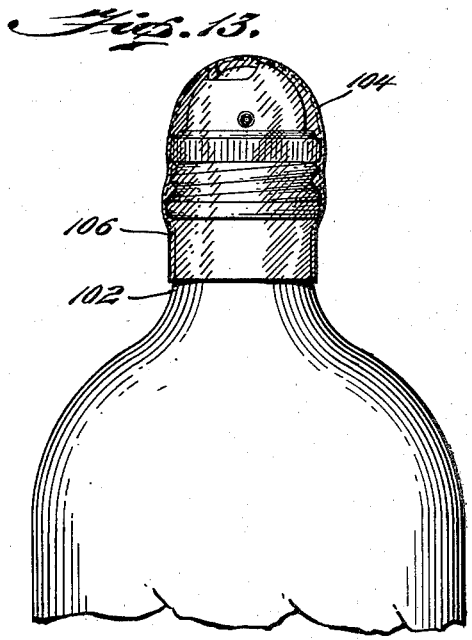
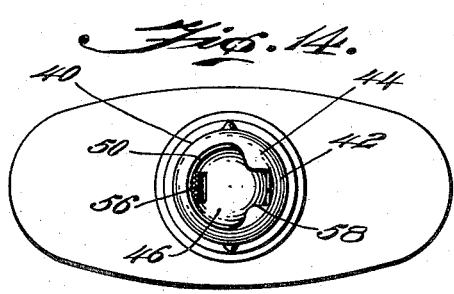
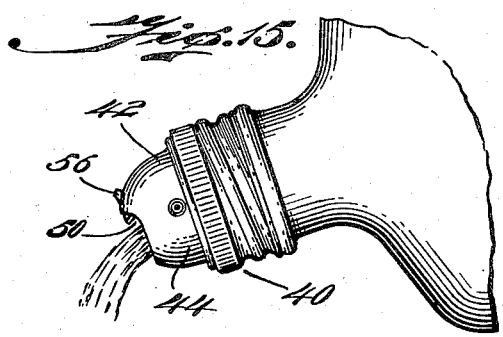
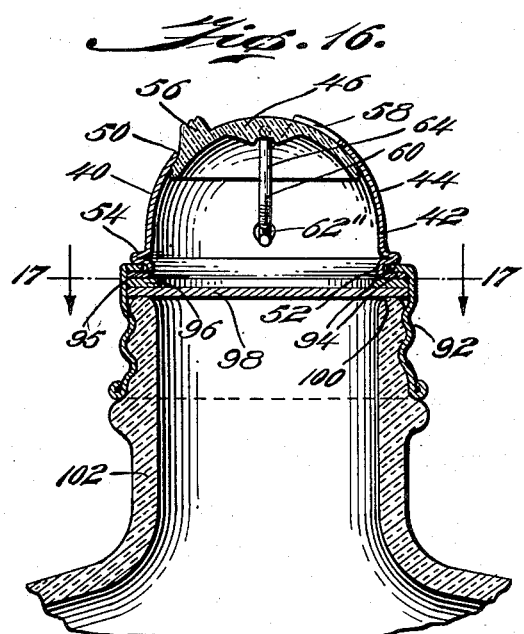
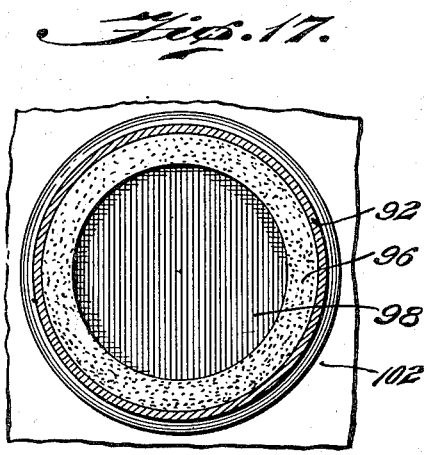
Inventor
Albert C. Lusher
By Thomas A. Jenckes
Attorney July 23, 1940.  A. C. LUSHER  2,209,062
NOZZLE CLOSURE MEANS FOR CONTAINERS
Filed Oct. 28, 1938   5 Sheets-Sheet 3
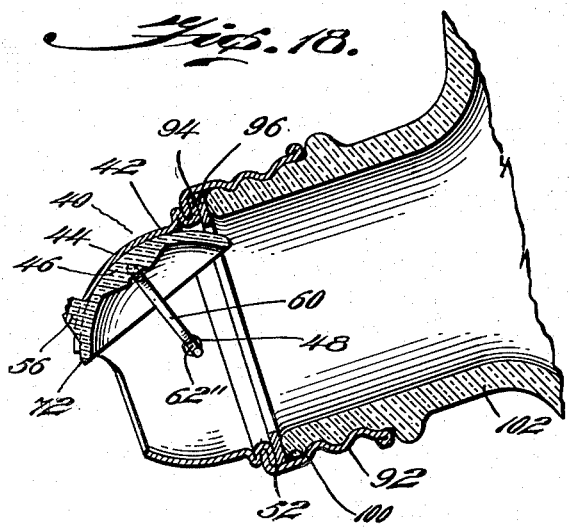
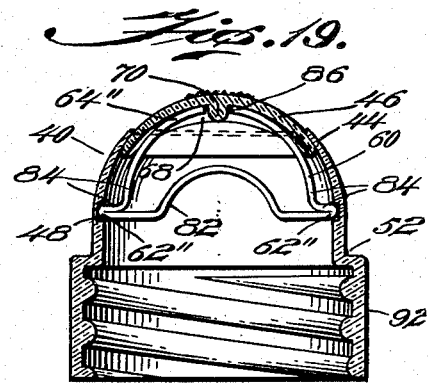
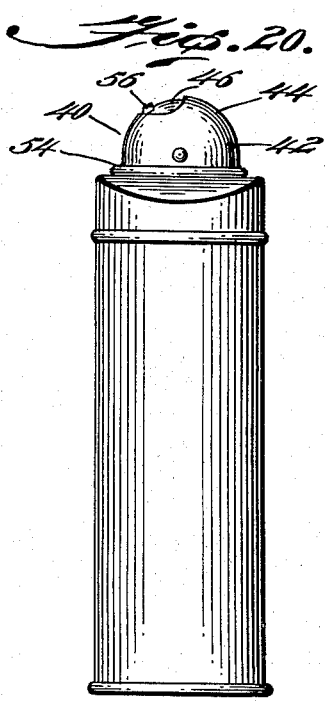
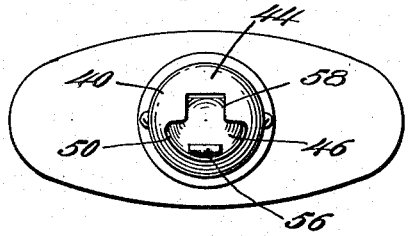
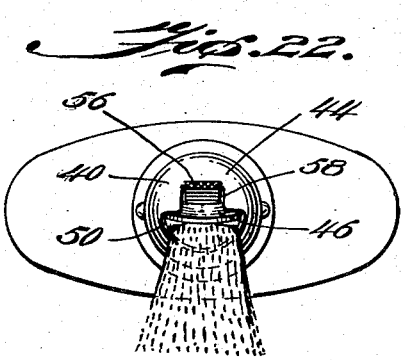
Inventor
Albert C. Lusher
By Thomas A. Jenckes
Attorney July 23, 1940. A. C. LUSHER 2,209,062
NOZZLE CLOSURE MEANS FOR CONTAINERS
Filed Oct. 28, 1938 5 Sheets-Sheet 4
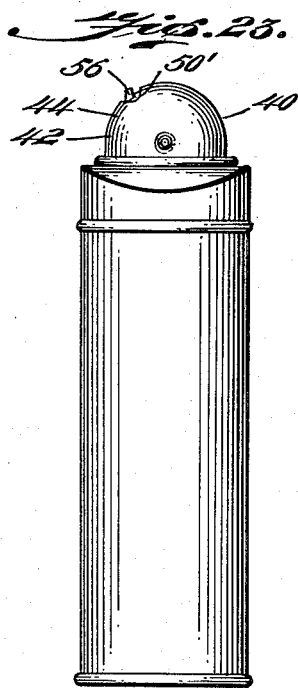
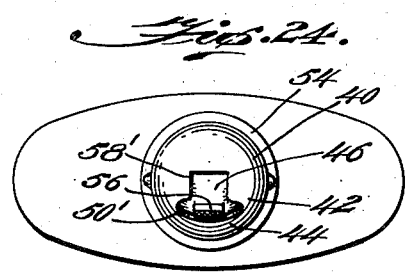
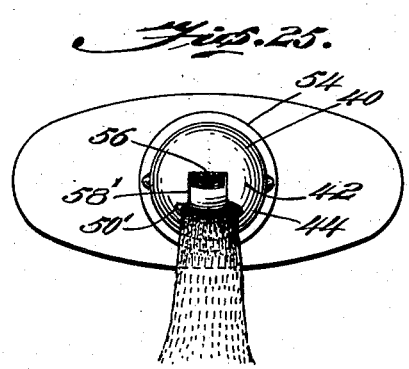
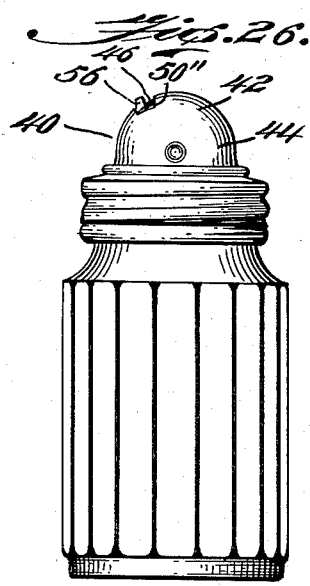
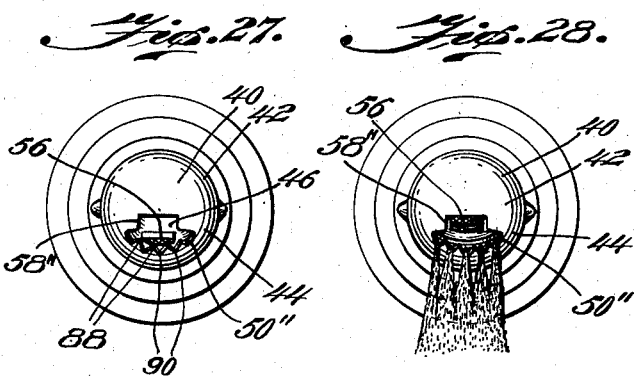
Inventor
Albert C. Lusher
By Thomas A. Jenckes
Attorney July 23, 1940.  A. C. LUSHER  2,209,062
NOZZLE CLOSURE MEANS FOR CONTAINERS
Filed Oct. 28, 1938  5 Sheets-Sheet 5

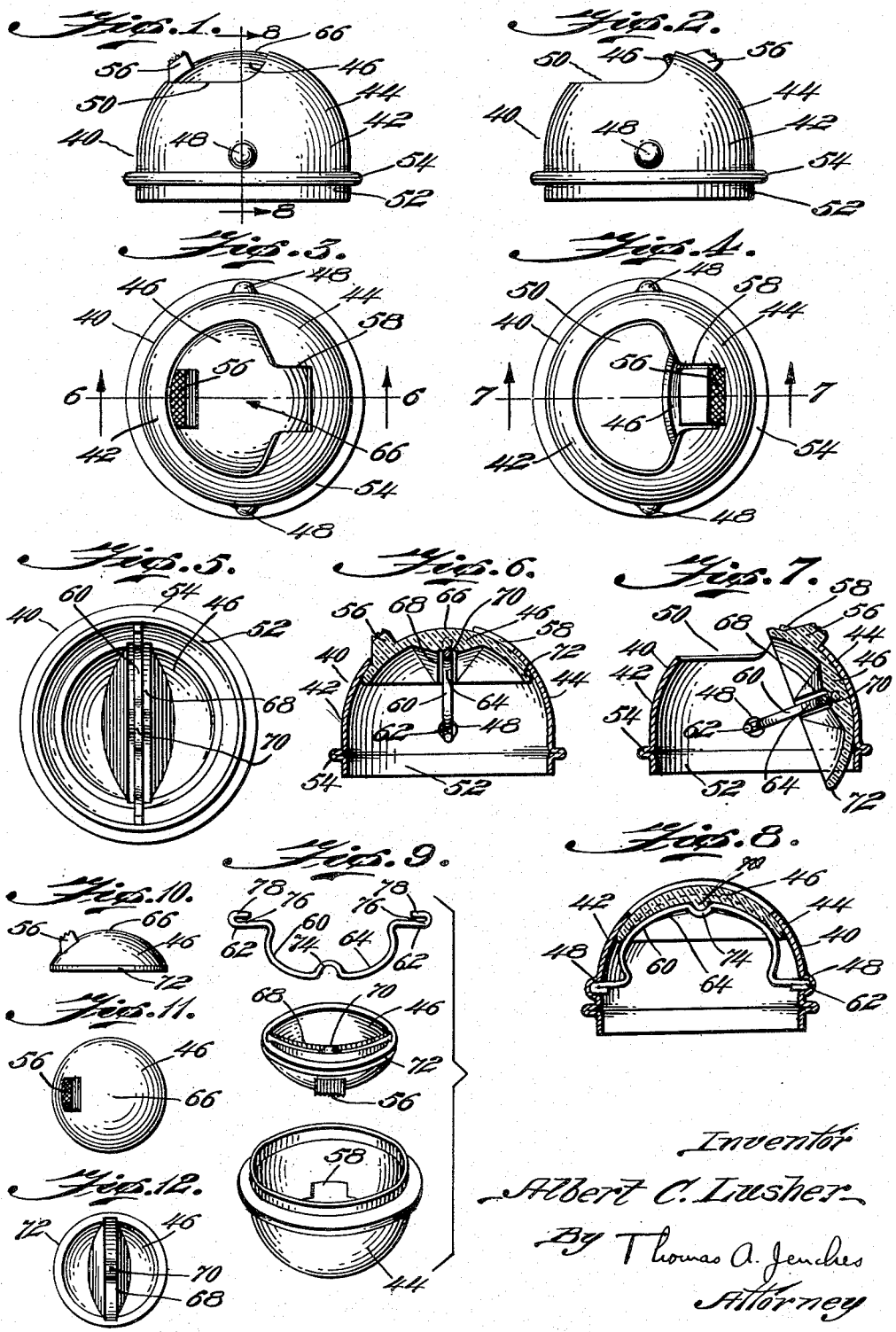

Inventor
Albert C. Lusher
By Thomas A. Jenckes
Attorney

Patented July 23, 1940

2,209,062

UNITED STATES PATENT OFFICE 2,209,062

NOZZLE CLOSURE MEANS FOR CONTAINERS

Albert C. Lusher, Waterbury, Conn., assignor, by mesne assignments, to No-Kap Closures (U. S. A.) Inc., Providence, R. I., a corporation of Rhode Island Application October 28, 1938, Serial No. 237,507

26 Claims. (Cl. 221—62)

My invention relates to improvements in nozzle closure means for a container and comprises certain novel features in the nozzle closure means itself and various component parts thereof whether said nozzle closure means is adapted to be an integral or permanent part of the entire container, such as in an extruded collapsible tube, an integral part of the top of the container as may be the case in a can top, or whether it is a separate nozzle part adapted to be sold as a unit for later attachment by the can or other container manufacturer to a perforation in the top wall of the can or container or otherwise, or for use for securement to a bottle top or otherwise.

My invention in certain aspects thereof is an improvement on the inventions disclosed in Patent No. 2,126,815 to James Rest, Container for flowable material; Patent No. 2,127,465 to Albert H. Church, Nozzle closure means for containers, and the disclosure shown in the application for patent, Ser. No. 137,517 of Albert H. Church, filed April 17, 1937, for nozzle closure means for containers and method of making same, comprising novel improvements of the structures shown therein, particularly as applied to can or bottle tops to provide a novel combination including spring means to positively insure a leakproof structure at all times.

My invention particularly relates to improvements in the specific kind of nozzle closures illustrated in said application, Ser. No. 137,517, which include inner and outer nested cooperating relatively oscillatable inner and outer shell portions, my specific improvements performing all the desirable novel functions of the structures shown therein and in addition providing a more leakproof nozzle closure.

These and such other objects of my invention as may hereinafter appear will be best understood from a description of embodiments thereof, such as are shown in the accompanying drawings.

In the drawings,

Fig. 1 is a side elevation of one embodiment of closure means for a container constructed in accordance with my invention with the closure in closed position.

Fig. 2 is a side elevation of the embodiment of my invention shown in Fig. 1 with the closure in open position.

Fig. 3 is a plan view of the embodiment of my invention shown in Fig. 1 with the closure also in closed position.

Fig. 4 is a plan view of the embodiment of my invention shown in Fig. 2 with the closure in open position.

Fig. 5 is a reverse plan view of the embodiment of my invention shown in Figs. 1 to 4.

Fig. 6 is a vertical sectional view of the embodiment of my invention shown in Figs. 1 to 5 with the closure in closed position taken along the line 6—6 of Fig. 3.

Fig. 7 is a vertical sectional view of the embodiment of my invention shown in Figs. 1 to 5 taken along the line 7—7 of Fig. 4.

Fig. 8 is a vertical sectional view of the embodiment of my invention shown in the previous figures taken at right angles to the plane of Fig. 6 with the closure in closed position.

Fig. 9 is an inverted disassembled perspective view of the three component parts of my invention.

Fig. 10 is a side elevation of the specific type of valve closure I preferably employ.

Fig. 11 is a plan view thereof.

Fig. 12 is a reverse plan view thereof.

Fig. 13 is a side elevation of a modified form of my invention in use on a bottle top.

Fig. 14 is a plan view thereof with the frangible flexible covering shown in Fig. 13 removed.

Fig. 15 is a side elevation of the embodiment of my invention shown in Figs. 13 and 14 with the valve closure in open position and the device in pouring position.

Fig. 16 is a vertical sectional view of the embodiment shown in Fig. 13 with the covering material removed.

Fig. 17 is a horizontal sectional view taken along the line 17—17 of Fig. 16.

Fig. 18 is a vertical sectional view of the same embodiment in the same position assumed in Fig. 15.

Fig. 19 is a vertical sectional view of an alternative embodiment of my invention illustrating an alternative type of spring and with the nozzle constructed of composition material.

Figs. 20 to 28 comprise three groups of three alternative embodiments of my invention, Figs. 20 to 22 being respectively an elevation, a plan view in closed position, and a plan view with the valve in open dispensing position of an embodiment of my invention adapted to dispense bulk powder, such as tooth powder, Figs. 23 to 25 being respectively an elevation, a plan view in closed position, and a plan view with the valve in open dispensing position of an embodiment of my invention adapted to dispense a small amount of pulverant material, such as dusting or face powder, and Figs. 26 to 28 being respectively an elevation, a plan view in closed position and a plan view with the valve in open dispensing position of an embodiment of my invention adapted to dispense spaced small streams of material, such as condiments.

Figure 29:
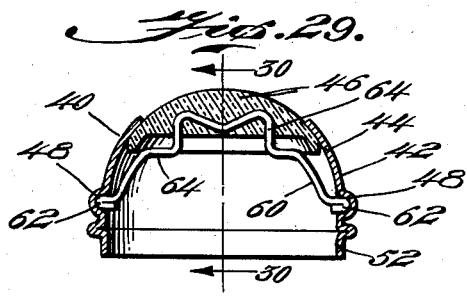
Figure 30:
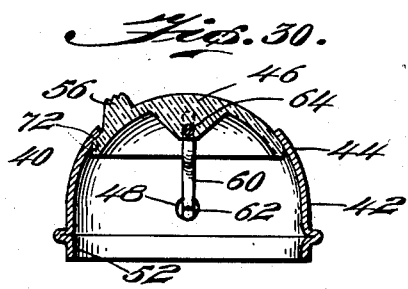
Figure 31:
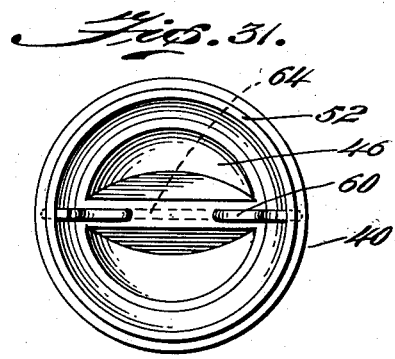
Figure 32:
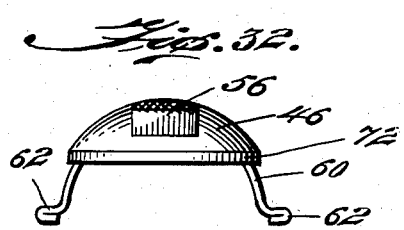
Figure 33:
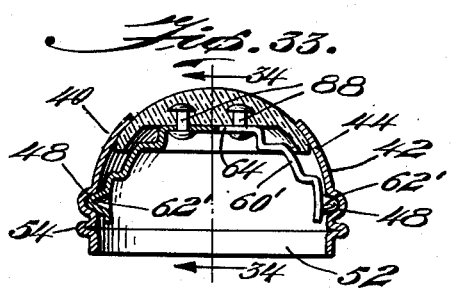
Figure 34:
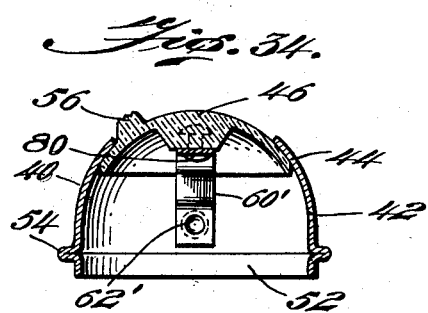
Figure 35:
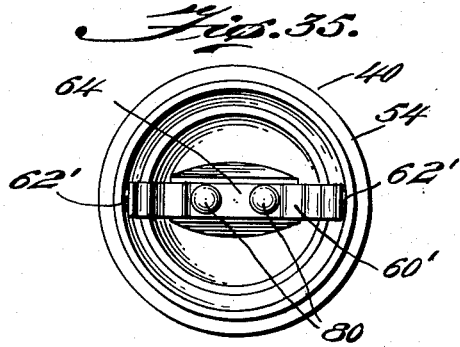
Figure 36:
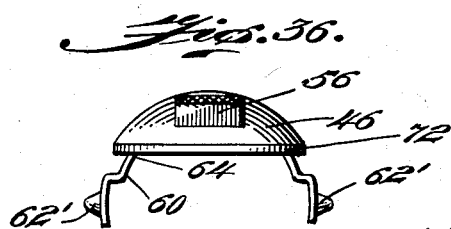

Figs. 29 to 36 are views of two alternative embodiments of springs that I may employ in my invention, Fig. 29 being a vertical sectional view, Fig. 30 being a vertical sectional view at right angles thereto and Fig. 31 being a reverse plan view of my entire combination of nozzle closure means employing one alternative type of spring, Fig. 32 being an elevation of the valve closure and attached spring itself, and Fig. 33 being a vertical sectional view, Fig. 34 being a vertical sectional view at right angles thereto, and Fig. 35 being a reverse plan view of my entire combination of nozzle closure means employing another alternative type of spring and Fig. 36 being an elevation of the valve closure and attached spring itself.

In the drawings, wherein like characters of reference generally indicate like parts throughout, 40 generally indicates a nozzle closure means for a container constructed in accordance with my invention.

As stated hitherto, my invention is in certain respects an improvement on the type of closure means for a container shown and described in said application, Serial No. 137,517 of A. H. Church for Nozzle closure means for containers and includes the same generic type of nozzle 42 having at its upper end an outer hemi-spherical shell 44 and an inner at least partially spherical shell closure member 46 of substantially the radius of said outer shell. The outer hemi-spherical shell 44 of said nozzle is preferably provided with diametrically opposite single axis forming means thereon, in the embodiments shown, comprising internal dimples 48 struck diametrically radially outwardly of said inner shell, dispensing hole means 50 therein and a wall 52 projecting integrally downwardly from said outer hemi-spherical shell. Said wall 52 may comprise a wall of a collapsible tube or the wall of a can top, but in my preferred embodiment I have shown a nozzle closure means 40 which may be sold per se as a unit and which is adapted to have the lower portion thereof secured to the container in manners well known in the art and illustrated in the drawings. In the embodiments shown, the wall 52 is provided as usual with a circumferential bead 54 adapted to overlie a hole in a can or other container, the wall 52 below said bead being crimped outwardly against the inner surface of the top wall of the container exterior of the container hole to secure the can top thereto although any other means of securing the wall 52 to the container may be employed. The nozzle end 44 and inner closure member 46 may be of any suitable shape, partially spherical as shown, partially cylindrical or otherwise, so long as the nozzle end be rounded to permit a closure member of cooperating shape to be slidably pivotably mounted therein.

The inner shell closure member is preferably provided with a turning lug 56 projecting upwardly therefrom through said outer shell 44.

In all embodiments of my invention shown, however, the outer hemi-spherical shell is provided with a vertical channel 58 leading from a dispensing hole means for a purpose to be described. It is obvious, however, that the lug 56 may project upwardly to pivot within said dispensing hole 50 alone, or, as shown, also into the channel 58 where employed.

My invention particularly relates, as stated, to the structure of means employed for solely supporting the inner shell 46 within the outer shell 44 and for this purpose I employ means including spring means 60 preferably oscillatable with said inner shell 46 and preferably having at least portions thereof 62 located substantially diametrically of said inner and outer shells, if the diametrically opposite single axis forming means, such as the internal dimples 48 be employed on the outer shell adjacent said dimples to cooperate therewith and a portion 64 abutting said inner shell 46 to solely support said inner shell 46 within said outer shell. It is obvious, however, that any type of means, including spring means, preferably oscillatable with the inner shell 46, may be provided to solely support said inner shell 46 within said outer shell 44 to prevent said inner shell 46 from dropping into the container and solely retaining it firmly against said inner shell in intimate leak-proof juxtaposition therewith whether or not said supporting means forms a horizontal diametric axis of oscillation for said inner shell 46. It is apparent, therefore, that the closure means includes not only the inner shell 46 but also its supporting means which preferably include the spring means heretofore referred to.

In the preferred embodiment shown the inner shell 46 is of substantially the radius of the outer shell 44 to compactly register against said outer shell in all positions thereof, and is preferably at least slightly greater than the circumferential length of said vertical channel 58 and dispensing hole means 50. The turning lug 56 projects upwardly from said inner shell 46 at a slightly spaced distance from adjacent one end thereof spaced from the opposite end thereof at least slightly more than the circumferential length of said dispensing opening 50 and channel 58 so that when in closed position the inner shell positively closes said dispensing opening 50 and channel 58, and it is obvious that when the turning lug 56 is moved to an open position it may freely pivot within the channel 58 to permit the inner shell to completely pivot away from the dispensing opening 50. It is thus apparent that with this specific type of construction both the dispensing opening and inner shell may be made of smaller dimensions and that the circumferential length of the dispensing opening may be very small with the length of the channel regulating the amount of pivotable movement of the inner shell.

The turning lug 56 is also preferably of a height substantially that of or substantially not more than that of the tip 66 or highest point of the spherical outer periphery of the shell. It is apparent that with this construction the turning lug no longer protrudes sufficiently above the top of the nozzle closure means to permit of accidental movement of the closure itself from a closed position and for other reasons to be explained. The specific type of shell closure 46 shown is of spherical segmental shape. It has a diametric circumferential channel 68 on the inner periphery thereof having a central projection 70 therein for holding therein the specific type of spring I preferably employ against axial movement within the channel. The outer surface of the lower edge of the wall of said shell preferably projects vertically downwardly circumferentially thereof as at 72. With this construction the valves may be readily molded of composition material with no projecting burr which oftentimes in the past has not been successfully tumbled off or otherwise removed to provide a perfectly even external periphery of the inner shell for even, close contact with the inner periphery of the outer shell. It is obvious, however, that inner shell valves of other shapes may be employed, and it is apparent that any of the valves shown in said Church application, Ser. No. 137,517, may be employed. It is essential, however, that the inner shell valve 46 have a portion thereof shaped to provide an open dispensing portion adapted to uncover said outer shell dispensing hole means on movement of said turning lug whether said portion be provided by a hole in the shell or in the shape of the shell itself. The nozzle or outer shell is preferably made of stamped, pressed or otherwise pressure shaped sheet metal, although it may be constructed of composition material as in the embodiment shown in Fig. 19 or other suitable material. The inner shell or closure is preferably constructed of molded composition material such as Bakelite, although it may be constructed of metal or other type of material.

I have shown in the drawings various types of spring means 60 which may be employed in my invention, all types of spring means shown having the rigid lugs or trunnions 62 projecting diametrically from opposite portions thereof and the portion 64 adapted to abut the inner shell. The spring means 60 may comprise a piece of resilient metal stock having a center shell supporting portion 64 of substantially semi-circular shape adapted to register against said inner shell and more rigid lug or trunnion forming portions 62 projecting diametrically from the diametric ends of said shell supporting portion. In the embodiment of spring means 60 shown in Figs. 1 to 18, the spring means 60 comprises a piece of wire stock having its center portion 64 bent in substantially semi-circular shape having a radially indented portion 74 centrally thereof and the ends 62 thereof projecting first diametrically outwardly as at 76 and then radially inwardly as at 78 to form the more rigid pivot trunnions 62. In the embodiment of spring means shown in Figs. 29 to 32, the portion of the center portion 64 actually abutting the inner shell is integrally imbedded or molded into the shell to rigidly secure it thereto. In the embodiment of my invention shown in Figs. 33 to 36, the spring 60 is constructed of resilient flat metal stock having a center shell supporting portion 64 of substantially semi-circular shape adapted to register against said inner shell 46 and be secured thereto by the rivets 80 and the more rigid lug forming portions 62' being struck diametrically outwardly from the flat diametric ends of said flat stock. In the embodiment of my invention shown in Fig. 19 the spring means 60 comprises a piece of wire comprising a central diametrically extending portion 82 terminating in pivot forming ends 62" and integral continuations 84 of said ends projecting first radially inwardly and then together substantially semi-circularly upwardly and terminating in alignment with each other and at a slightly spaced distance from each other substantially at the tip of said semi-circle so as to receive in the space 86 between them the projection 70 in the channel 68 on the inner periphery of said inner shell 46, said continuations thus forming the center shell supporting portion 64" of said spring. It is apparent that the projection 70 is for the purpose of keeping the shell 46 in alignment relative to the spring 60, in the embodiment shown in Fig. 19 registering in the space 86 between the ends of the spring and in the embodiment shown in Figs. 1 to 18 in the indentation 74 of the shell supporting portion 64 of said spring, it being obvious that if the shell be maintained to pivot in a fixed position with the spring that it will remain in accurate alignment for completely closing the dispensing hole means 50 in the outer shell and correct position for continuous alignment of the lug 56 with the channel 58. In practice it is obvious that the device may be readily assembled by inserting the center portion 64 of the spring within the channel 68 and pushing the spring upwardly within the nozzle until the diametric lug or trunnion portions 62 snap within the internal dimples 48 of the outer shell.

As stated hitherto, my invention may be employed as a combination stopper and pouring device for a liquid container as shown in Figs. 13 to 18 or as a stopper and pouring device for a can or powder container, as shown in Figs. 20 to 28. I have shown in Figs. 20 to 22 a device provided with a dispensing opening 50 of substantial circumferential length and a channel 58 connected thereto of substantial circumferential length so that a large opening may be provided for the rapid dispensing of bulk powder, such as tooth powder. If it be desired to provide a smaller opening the circumferential length of the dispensing opening 50' and the circumferential length of the channel 58' may be correspondingly shortened as in the embodiment shown in Figs. 23 to 25 adapted to dispense a small ribbon of powder, such as face powder. I have shown in Figs. 26 to 28 a device adapted to dispense spaced small streams of flowable material only from the container. In this instance the dispensing opening 50" is made of relatively short circumferential length, as well as the channel 58" and the lower dispensing edge 88 of the dispensing hole means 50", is provided with serrations 90 although it is obvious the serrations may, if desired, be provided on the corresponding edge of the inner shell. This embodiment of my invention is particularly useful in dispensing condiments.

I have shown in Figs. 13 to 18 my invention adapted for use as a combination pouring device and nozzle closure adapted for use in dispensing liquids or other flowable material from a bottle or other type of container. In this embodiment of my invention the dispensing hole means 50' comprises a single enlarged opening of a size to dispense liquid and admit enough air to said bottle simultaneously for the rapid discharge of liquid therefrom. The cylindrical wall 52 depending from the outer hemi-spherical shell 44 of the nozzle 42 has a lower portion 92 of larger circumference forming an annular sealing shoulder 94 between said portions. If desired, however, the lower edge of the depending wall 52 of the nozzle 44 may be crimped outwardly to provide an annular groove 95 therein just below the bead 54 to receive the inwardly projecting edge 94 of a separate tubular member 92 adapted to surround the bottle neck if desired, it being apparent that so far as the functioning goes, it is immaterial if the lower portion 92 with the upper shoulder forming edge 94 be constructed of a separate piece or be continuous with the lower wall 52 of the nozzle. Suitable means may be provided on said lower wall portion 92 whether it be a continuation of the wall 52 or a separate member for securing the nozzle closure to the bottle neck, such as the cooperating threaded portions shown. To provide a package which will be leak-proof during shipping and will be positively air sealed prior to use an annular washer 96, which is preferably constructed of resilient material and a solid circular disc washer 98 which may be made of metal are interposed between the top 100 of the bottle neck 102 and said nozzle wall sealing shoulder 94, said solid circular washer 98 providing a leak-proof seal for shipping purposes.

As stated hitherto, the lug 56 in a vertical position is of a height and so located on the shell 46 to be in closed position no more than the height of the outer shell 44. This is particularly advantageous if it be desired to cover the bottle closure with a frangible flexible covering 104, such as Cellophane or metal foil, which may extend spherically evenly over said closure lug 56 and outer shell 44 and be provided with a depending skirt portion 106 which may be secured to the exterior of the neck 102 of the bottle or other container. It is thus obvious that a package for shipping liquids may be provided which will comply with all revenue laws being tight against liquid and air leaks. When it is desired to use the contents of the bottle or other container the frangible covering 104 may be readily broken, the nozzle closure means 40 temporarily removed from the bottle neck 102, the circular disc sealing washer 98 removed, and the closure reinserted on the bottle neck leaving the annular washer 96 in position and the device is ready for dispensing purposes.

It is thus apparent that I have provided a novel type of nozzle closure means for containers which may be readily attached to bottles, cans or other types of containers, which is substantially leak-proof and has the other advantages set forth above.

It is understood that my invention is not limited to the specific embodiments shown and that various deviations may be made therefrom without departing from the spirit and scope of the appended claims.

What I claim is:

1. Nozzle closure means for a container comprising a nozzle having at its upper end an outer hemi-spherical shell having diametrically opposite single axis of oscillation forming means thereon, dispensing hole means therein and a wall projecting integrally downwardly therefrom, an inner, partially spherical, shell closure member of substantially the radius of said outer shell contained within said outer shell having a turning lug projecting upwardly therefrom through said outer shell and spring means having portions projecting diametrically thereof adjacent said outer shell diametric axis forming means to cooperate therewith and a portion abutting said inner shell to solely support said inner shell within said outer shell to prevent said inner shell from dropping into the container, to solely retain it firmly against said outer shell in intimate nested leak-proof juxtaposition therewith and to form a single horizontal diametric axis of oscillation for said inner shell, said inner shell member having a portion thereof shaped to provide an opening dispensing portion adapted to uncover said outer shell dispensing hole means on movement of said turning lug.

2. Nozzle closure means for a container comprising a nozzle having at its upper end an outer hemi-spherical shell, having diametrically opposite axis of oscillation forming means thereon, dispensing hole means therein and a wall projecting integrally downwardly therefrom, an inner spherical segmental shell closure member of substantially the radius of said outer shell contained within said outer shell having a turning lug projecting upwardly therefrom through said outer shell and spring means having portions projecting diametrically thereof adjacent said outer shell diametric axis forming means to cooperate therewith and a portion abutting said inner shell to solely support said inner shell within said outer shell to prevent said inner shell from dropping into the container, to solely retain it firmly against said outer shell in intimate nested leak-proof juxtaposition therewith and to form a single horizontal diametric axis of oscillation for said inner shell.

3. Nozzle closure means for a container comprising a nozzle having at its upper end an outer hemi-spherical shell having diametrically opposite single axis of oscillation forming means thereon, dispensing hole means therein and a wall projecting integrally downwardly therefrom, an inner, partially spherical, shell closure member of substantially the radius of said outer shell contained within said outer shell having a turning lug projecting upwardly therefrom through said outer shell and spring means preventing said inner shell from dropping into the container and solely retaining it firmly against said outer shell in intimate nested leak-proof juxtaposition therewith and cooperating with said diametric axis forming means of said shell to form a single horizontal diametric axis of oscillation for said inner shell, said inner shell member having a portion thereof shaped to provide an opening dispensing portion adapted to uncover said outer shell dispensing hole means on movement of said turning lug.

4. Nozzle closure means for a container comprising a nozzle having at its upper end an outer hemi-spherical shell having diametrically opposite single axis of oscillation forming means thereon, dispensing hole means therein and a wall projecting integrally downwardly therefrom, an inner spherical segmental shell closure member of substantially the radius of said outer shell contained within said outer shell having a turning lug projecting upwardly therefrom through said outer shell and spring means preventing said inner shell from dropping into the container and solely retaining it firmly against said outer shell in intimate nested leak-proof juxtaposition therewith and cooperating with said diametric axis forming means of said shell to form a single horizontal diametric axis of oscillation for said inner shell.

5. Nozzle closure means for a container comprising a nozzle having at its upper end an outer hemi-spherical shell having dispensing hole means therein and a wall projecting integrally downwardly therefrom, an inner, partially spherical, shell closure member of substantially the radius of said outer shell contained within said outer shell having a turning lug projecting upwardly therefrom through said outer shell and means including spring means oscillatable with said inner shell preventing said inner shell from dropping into the container and solely retaining it firmly against said outer shell in intimate nested leak-proof juxtaposition therewith and forming a single horizontal diametric axis of oscillation for said inner shell, said inner shell member having a portion thereof shaped to provide an opening dispensing portion adapted to uncover said outer shell dispensing hole means on movement of said turning lug.

6. Nozzle closure means for a container comprising a nozzle having at its upper end an outer hemi-spherical shell having dispensing hole means therein and a wall projecting integrally downwardly therefrom, an inner spherical segmental shell closure member of substantially the radius of said outer shell contained within said outer shell having a turning lug projecting upwardly therefrom through said outer shell and means including spring means oscillatable with said inner shell preventing said inner shell from dropping into the container and solely retaining it firmly against said outer shell in intimate nested leak-proof juxtaposition therewith and forming a single horizontal diametric axis of oscillation for said inner shell.

7. Nozzle closure means for a container comprising a nozzle having at its upper end an outer hemi-spherical shell, having dispensing hole means therein and a wall projecting integrally downwardly therefrom, an inner partially spherical shell closure member of substantially the radius of said outer shell contained within said outer shell having a turning lug projecting upwardly therefrom through said outer shell and means, including spring means, oscillatable with said inner shell having at least portions thereof located substantially diametrically of said inner and outer shells for solely supporting said inner shell within said outer shell to prevent said inner shell from dropping into the container, and solely retaining it firmly against said outer shell in intimate nested leak-proof juxtaposition therewith and forming a horizontal diametric axis of oscillation for said inner shell, said inner shell member having a portion thereof shaped to provide an open dispensing portion adapted to uncover said outer shell dispensing hole means on movement of said turning lug.

8. Nozzle closure means for a container comprising a nozzle having at its upper end an outer hemi-spherical shell, having dispensing hole means therein and a wall projecting integrally downwardly therefrom, an inner partially spherical shell closure member of substantially the radius of said outer shell contained within said outer shell having a turning lug projecting upwardly therefrom through said outer shell, and means, including spring means oscillatable with said inner shell, having at least portions thereof located substantially diametrically of said inner and outer shells for solely supporting said inner shell within said outer shell to prevent said inner shell from dropping into the container and solely retaining it firmly against said outer shell in intimate nested leak-proof juxtaposition therewith, said inner shell member having a portion thereof shaped to provide an open dispensing portion adapted to uncover said outer shell dispensing hole means on movement of said turning lug.

9. Nozzle closure means for a container comprising a nozzle having at its upper end an outer hemi-spherical shell, having dispensing hole means therein and a wall projecting integrally downwardly therefrom, an inner partially spherical shell closure member of substantially the radius of said outer shell contained within said outer shell having a turning lug projecting upwardly therefrom through said outer shell, and means, including spring means, oscillatable with said inner shell for solely supporting said inner shell within said outer shell to prevent said inner shell from dropping into the container and solely retaining it firmly against said outer shell in intimate nested leak-proof juxtaposition therewith, said inner shell member having a portion thereof shaped to provide an open dispensing portion adapted to uncover said outer shell dispensing hole means on movement of said turning lug.

10. Nozzle closure means for a container comprising a nozzle having at its upper end an outer hemi-spherical shell, having dispensing hole means therein and a wall projecting integrally downwardly therefrom and closure means, including an inner partially spherical shell closure member of substantially the radius of said outer shell contained within said outer shell having a turning lug projecting upwardly therefrom through said outer shell and means, including spring means oscillatable with said inner shell; said closure means having at least portions thereof located substantially diametrically of said closure means and outer shell for solely supporting said inner shell within said outer shell to prevent said inner shell from dropping into the container and solely retaining it firmly against said outer shell in intimate nested leak-proof juxtaposition therewith and forming a horizontal diametric axis of oscillation for said inner shell, said inner shell member having a portion thereof shaped to provide an open dispensing portion adapted to uncover said outer shell dispensing hole means on movement of said turning lug.

11. Nozzle closure means for a container comprising a nozzle having at its upper end an outer hemi-spherical shell, having dispensing hole means therein and a wall projecting integrally downwardly therefrom and closure means, including an inner partially spherical shell closure member of substantially the radius of said outer shell contained within said outer shell having a turning lug projecting upwardly therefrom through said outer shell and means, including spring means oscillatable with said inner shell; said closure means having at least portions thereof located substantially diametrically of said closure means and outer shell for solely supporting said inner shell within said outer shell to prevent said inner shell from dropping into the container and solely retaining it firmly against said outer shell in intimate nested leak-proof juxtaposition therewith, said inner shell member having a portion thereof shaped to provide an open dispensing portion adapted to uncover said outer shell dispensing hole means on movement of said turning lug.

12. Nozzle closure means for a container comprising a nozzle having at its upper end an outer hemi-spherical shell, having dispensing hole means therein and a wall projecting integrally downwardly therefrom and closure means, including an inner partially spherical shell closure member of substantially the radius of said outer shell contained within said outer shell having a turning lug projecting upwardly therefrom through said outer shell and means, including spring means oscillatable with said inner shell for solely supporting said inner shell within said outer shell to prevent said inner shell from dropping into the container and solely retaining it firmly against said outer shell in intimate nested leak-proof juxtaposition therewith, said inner shell member having a portion thereof shaped to provide an open dispensing portion adapted to uncover said outer shell dispensing hole means on movement of said turning lug.

13. Closure means for a container nozzle having at its upper end an outer hemi-spherical shell having dispensing hole means therein and a wall projecting integrally downwardly therefrom, comprising an inner partially spherical shell closure member of substantially the radius of said outer shell, and spring means comprising a piece of resilient metal stock having a center shell supporting portion of substantially semi-circular shape adapted to register against said inner shell and more rigid lug forming portions projecting diametrically from the diametric ends of said shell supporting portion.

14. Closure means for a container nozzle having at its upper end an outer hemi-spherical shell having dispensing hole means therein and a wall projecting integrally downwardly therefrom, comprising an inner partially spherical shell closure member of substantially the radius of said outer shell, and spring means having a center shell supporting portion adapted to register against said inner shell and lug forming portions projecting diametrically from the ends of said shell supporting portion.

15. Closure means for a container nozzle having at its upper end an outer hemi-spherical shell having dispensing hole means therein and a wall projecting integrally downwardly therefrom comprising an inner spherical segmental shell closure member of substantially the radius of said outer shell, and spring means comprising a piece of resilient metal stock having a center shell supporting portion of substantially semi-circular shape adapted to register against said inner shell and more rigid lug forming portions projecting diametrically from the diametric ends of said shell supporting portion.

16. Closure means for a container nozzle having at its upper end an outer hemi-spherical shell having dispensing hole means therein and a wall projecting integrally downwardly therefrom comprising an inner spherical segmental shell closure member of substantially the radius of said outer shell, and spring means having a center shell supporting portion adapted to register against said inner shell and lug forming portions projecting diametrically from the ends of said shell supporting portion.

17. A mounting spring for securing a spherical segmental inner shell within a hemi-spherical outer nozzle shell of a nozzle closure means for a container, comprising a piece of wire having its center portion bent into substantially semi-circular shape having a radially indented portion centrally thereof and the ends thereof projecting first diametrically outwardly and then radially inwardly to be adjacent thereto to form pivot lugs.

18. A mounting spring for securing a spherical segmental inner shell within a hemi-spherical outer nozzle shell of a nozzle closure means for a container, comprising a piece of wire having its center portion bent into substantially semi-circular shape and the ends thereof projecting diametrically outwardly to form pivot lugs.

19. A mounting spring for securing a spherical segmental inner shell within a hemi-spherical outer nozzle shell of a nozzle closure means for a container, comprising a piece of wire having its center portion bent into substantially semi-circular shape having a radially indented portion centrally thereof and the ends thereof projecting diametrically outwardly to form pivot lugs.

20. A mounting spring for securing a spherical segmental inner shell within a hemi-spherical outer nozzle shell of a nozzle closure means for a container, comprising a piece of wire having its center portion bent into substantialy semi-circular shape and the ends thereof projecting first diametrically outwardly and then radially inwardly to be adjacent thereto to form pivot lugs.

21. A mounting spring for securing a spherical segmental inner shell within a hemi-spherical outer nozzle shell of a nozzle closure means for a container, comprising a piece of resilient metal stock having a center shell supporting portion of substantially semi-circular shape adapted to register against said inner shell and more rigid lug forming portions projecting diametrically from the diametric ends of said shell supporting portion.

22. A mounting spring for securing a spherical segmental inner shell within a hemi-spherical outer nozzle shell of a nozzle closure means for a container, comprising a piece of resilient metal stock having a center shell supporting portion adapted to register against said inner shell and more rigid lug forming portions projecting diametrically from the ends of said shell supporting portion.

23. A mounting spring for securing a spherical segmental inner shell within a hemi-spherical outer nozzle shell of a nozzle closure means for a container, comprising a piece of resilient flat metal stock having a center shell supporting portion of substantially semi-circular shape adapted to register against said inner shell and more rigid lug forming portions struck diametrically outwardly from the flat diametric ends of said flat stock.

24. A mounting spring for securing a spherical segmental inner shell within a hemispherical outer nozzle shell of a nozzle closure means for a container, comprising a piece of wire comprising a central diametrically extending portion terminating in pivot forming ends and integral continuations of said ends projecting first radially inwardly and then together substantially semi-circularly upwardly and terminating in alignment with each other and at a slightly spaced distance from each other substantially at the tip of said semi-circle.

25. A mounting spring for securing a spherical segmental inner shell within a hemispherical outer nozzle shell of a nozzle closure means for a container, comprising a piece of wire comprising a central diametrically extending portion terminating in pivot forming ends and integral continuations of said ends projecting first radially inwardly and then together substantially semi-circularly upwardly and terminating in alignment with each other substantially at the tip of said semi-circle.

26. Dispensing closure means for a container comprising a rounded nozzle end with a dispensing hole therethrough, a closure member slidably fitted within said rounded end for selectively opening and closing said hole and having manual operating means projecting through said dispensing hole, and spring means pivoted on the diametric axis of said rounded nozzle end and serving to resiliently support and tightly seat said slidable closure member against the inner surface of said nozzle end.

ALBERT C. LUSHER.